United States Patent
Lee et al.

(10) Patent No.: US 9,635,163 B2
(45) Date of Patent: Apr. 25, 2017

(54) MOBILE TERMINAL AND CONTROLLING METHOD THEREOF

(71) Applicant: LG ELECTRONICS INC., Seoul (KR)

(72) Inventors: Seojin Lee, Seoul (KR); Donghwan Yu, Seoul (KR); Samsick Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/845,077

(22) Filed: Sep. 3, 2015

(65) Prior Publication Data
US 2016/0094698 A1 Mar. 31, 2016

(30) Foreign Application Priority Data
Sep. 26, 2014 (KR) .......... 10-2014-0129206

(51) Int. Cl.
| | |
|---|---|
| *H04M 1/725* | (2006.01) |
| *G06F 3/01* | (2006.01) |
| *G06Q 20/32* | (2012.01) |
| *G06Q 20/36* | (2012.01) |
| *H04W 4/00* | (2009.01) |
| *G06F 1/16* | (2006.01) |
| *H04W 4/20* | (2009.01) |
| *H04W 4/02* | (2009.01) |

(52) U.S. Cl.
CPC .......... *H04M 1/7253* (2013.01); *G06F 1/163* (2013.01); *G06F 1/1694* (2013.01); *G06F 3/014* (2013.01); *G06F 3/017* (2013.01); *G06Q 20/3224* (2013.01); *G06Q 20/3278* (2013.01); *G06Q 20/36* (2013.01); *H04W 4/008* (2013.01); *H04W 4/027* (2013.01); *H04W 4/206* (2013.01); *H04W 4/02* (2013.01)

(58) Field of Classification Search
CPC ..... H04M 1/7253; H04W 4/008; G06F 3/017; G06F 1/163; G06F 1/1694; G06Q 20/3278
USPC ........ 455/557, 566, 90, 158.4; 345/3.4, 156, 345/158, 699
See application file for complete search history.

(56) References Cited

U.S. PATENT DOCUMENTS

| | | | |
|---|---|---|---|
| 9,442,570 B2 * | 9/2016 | Slonneger | G06F 3/017 |
| 2005/0093868 A1 * | 5/2005 | Hinckley | G06F 3/011 |
| | | | 345/502 |

(Continued)

FOREIGN PATENT DOCUMENTS

WO WO 2011/066381 A2 6/2011

OTHER PUBLICATIONS

European Search Report issued in Application No. 15183906.5 dated Feb. 15, 2016.

*Primary Examiner* — Cong Tran
(74) *Attorney, Agent, or Firm* — Ked & Associates, LLP

(57) ABSTRACT

A mobile terminal and controlling method thereof are disclosed, by which a prescribed function can be performed using a more intuitive gesture. The present invention includes a touchscreen; a wireless communication device configured to communicate with an external terminal; a band configured to be worn on a user; a sensing device configured to sense movement of a physical object having the mobile terminal provided thereon; and a controller to detect a gesture based on the sensed movement, and to perform a prescribed function with respect to the external terminal based on the detected gesture.

18 Claims, 19 Drawing Sheets

(56) References Cited

U.S. PATENT DOCUMENTS

| | | | |
|---|---|---|---|
| 2007/0188323 A1 | 8/2007 | Sinclair et al. | |
| 2013/0127636 A1 | 5/2013 | Aryanpur et al. | |
| 2013/0201097 A1* | 8/2013 | Pasquero | G06F 3/0488 |
| | | | 345/156 |
| 2014/0282270 A1 | 9/2014 | Slonneger | |
| 2014/0317499 A1* | 10/2014 | Oh | G06F 3/04815 |
| | | | 715/702 |
| 2014/0365979 A1* | 12/2014 | Yoon | G06F 3/017 |
| | | | 715/863 |
| 2014/0368441 A1* | 12/2014 | Touloumtzis | G06F 3/017 |
| | | | 345/173 |
| 2014/0379341 A1* | 12/2014 | Seo | G10L 15/22 |
| | | | 704/246 |
| 2015/0012581 A1* | 1/2015 | Kim | H04W 4/005 |
| | | | 709/201 |
| 2015/0261310 A1* | 9/2015 | Walmsley | G06F 1/1626 |
| | | | 345/173 |
| 2015/0277572 A1* | 10/2015 | Verplaetse | G06F 3/017 |
| | | | 345/156 |
| 2015/0296480 A1* | 10/2015 | Kinsey | H04M 19/047 |
| | | | 455/41.3 |
| 2015/0363035 A1* | 12/2015 | Hinckley | G06F 3/0383 |
| | | | 345/173 |
| 2016/0085266 A1* | 3/2016 | Lee | H04N 5/2628 |
| | | | 348/240.2 |
| 2016/0110012 A1* | 4/2016 | Yim | G06F 1/1626 |
| | | | 345/173 |

* cited by examiner (a)   (b)

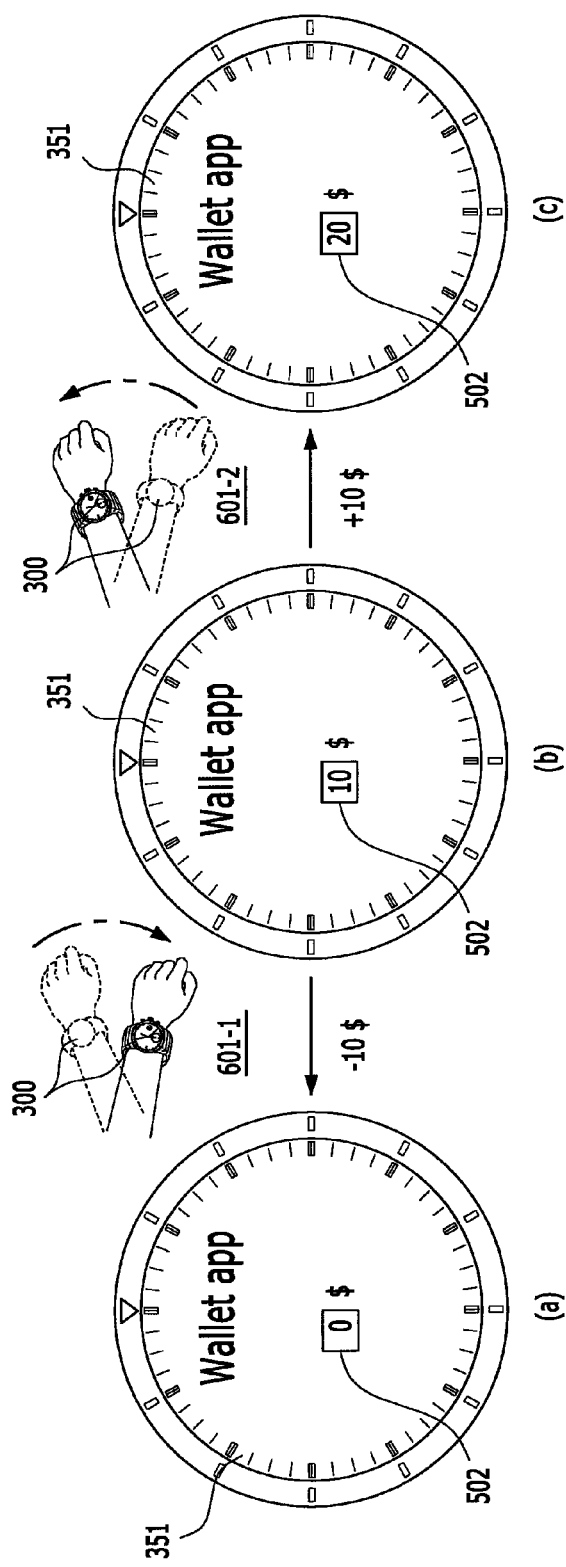

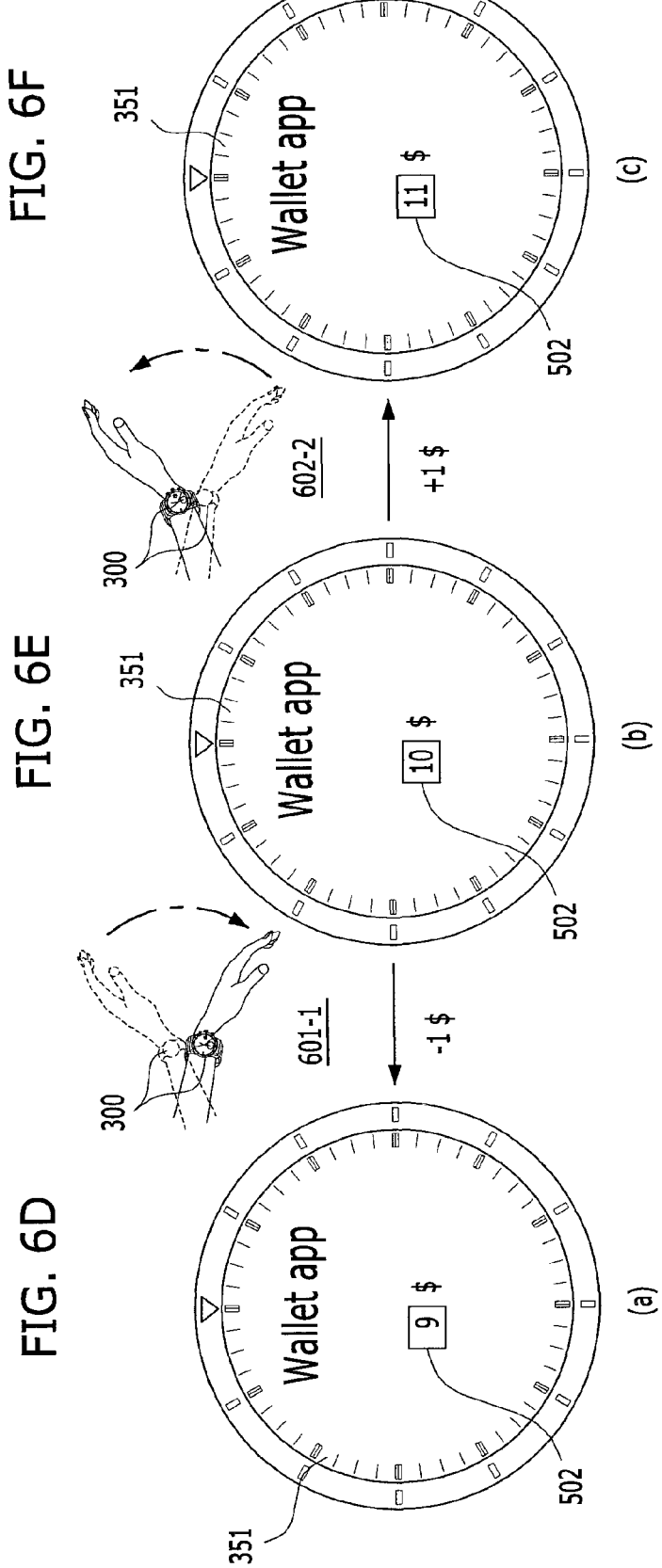

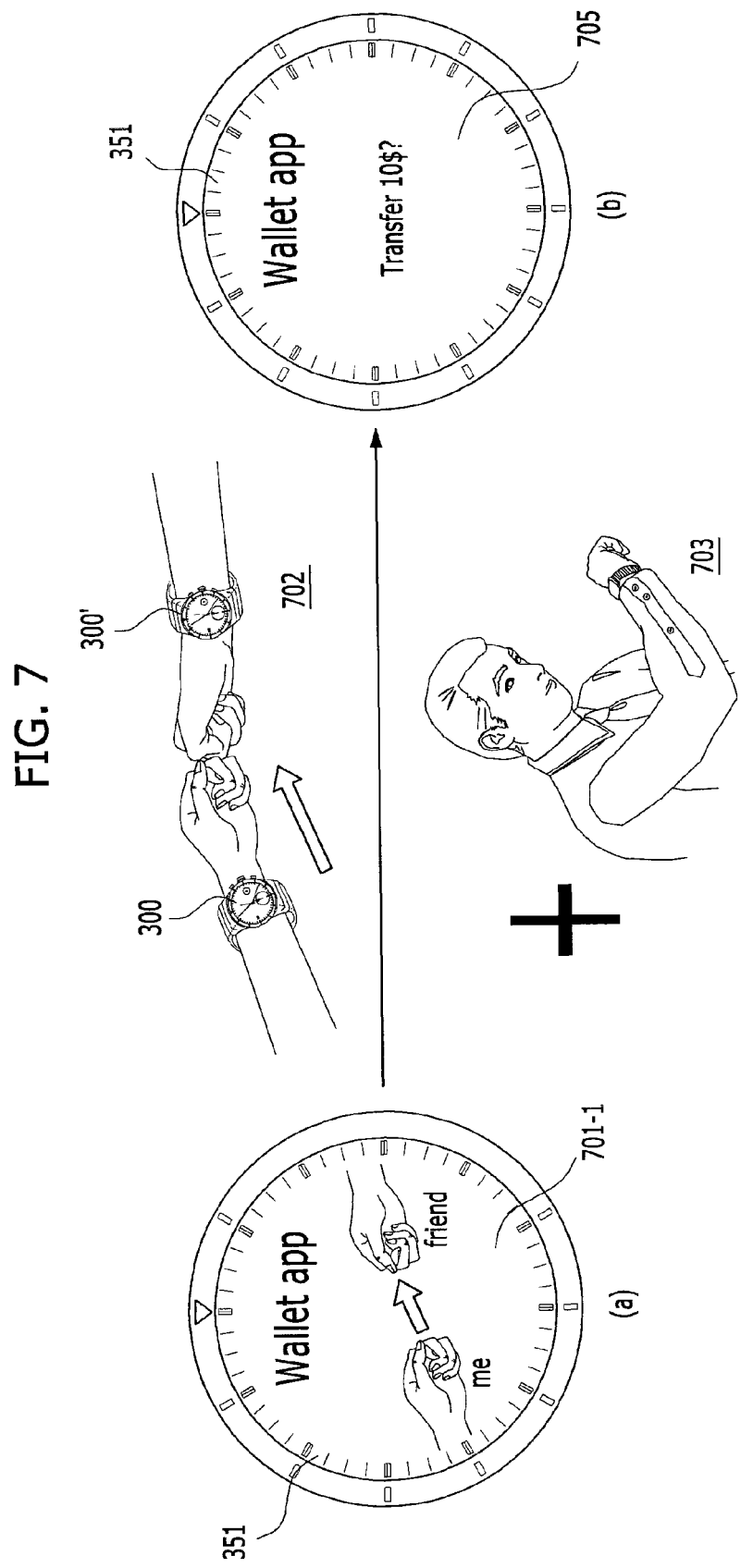

FIG. 13
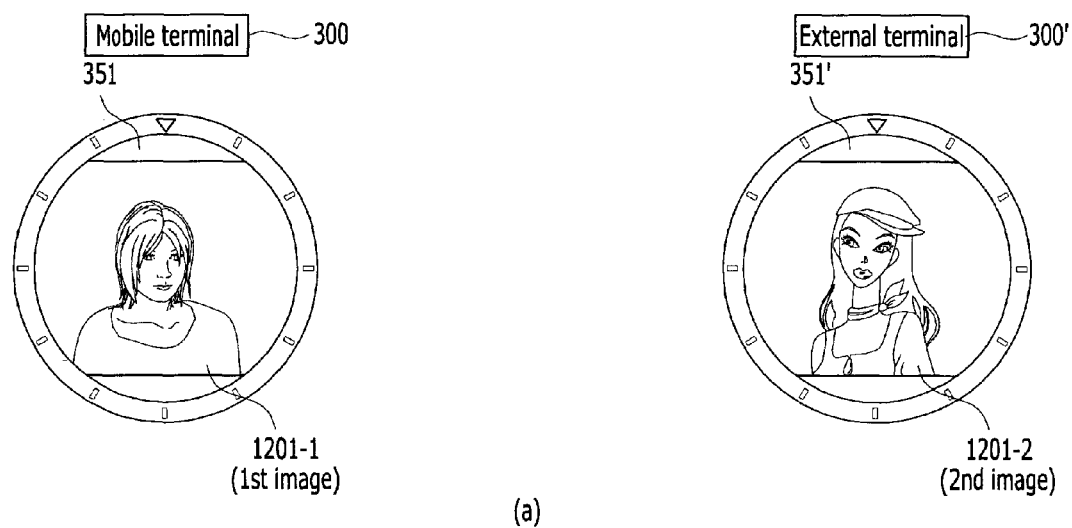
(a)
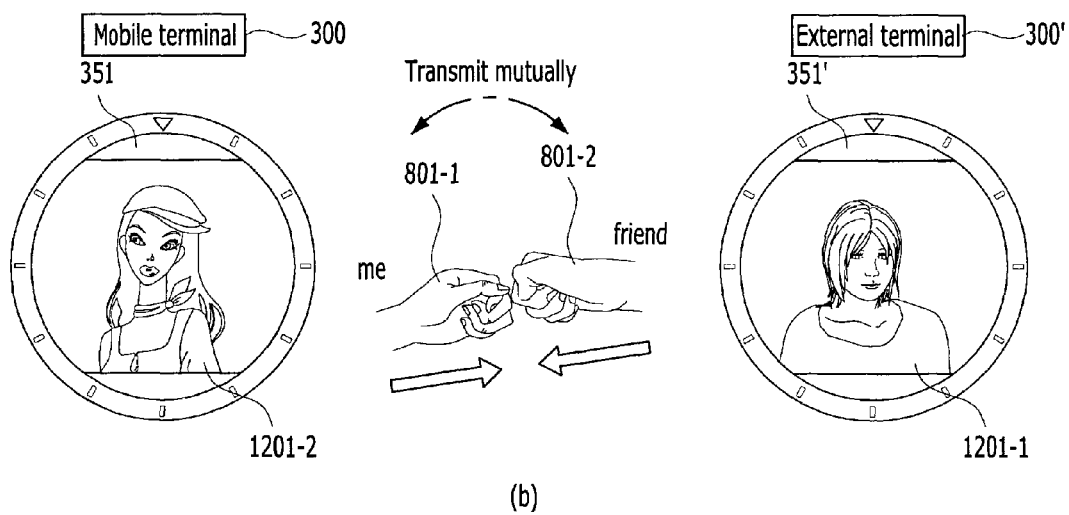
(b)

MOBILE TERMINAL AND CONTROLLING METHOD THEREOF

CROSS-REFERENCE TO RELATED APPLICATION

This application claims priority under 35 U.S.C. §119 to Korean Application No. 10-2014-0129206 filed on Sep. 26, 2014, whose entire disclosure is hereby incorporated by reference.

BACKGROUND

1. Field

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

The recent tendency of a mobile terminal market attempts to develop mobile terminals of various types to meet the diversity of the consumer's needs. The types of the developed mobile terminals are focused on the configuration that can emphasize the portability of the mobile terminal. The mobile terminal types for high portability can include such a type wearable on a user's body as a watch type, a glasses type, a necklace type and the like. The mobile terminals of those types exist in case of having difficulty in applying the conventionally used input/output means in the same manner. For instance, since these mobile terminals have a display size relatively smaller than that of a mobile terminal of an existing type, it is necessary to consider a different kind of an output means. Particularly, in case of a mobile terminal of a watch e type, an input means of a totally new type is required due to a limited size of the mobile terminal.

BRIEF DESCRIPTION OF THE DRAWINGS

The embodiments will be described in detail with reference to the following drawings in which like reference numerals refer to like elements wherein:

FIG. 6A(a), FIG. 6B(b), FIG. 6C(c), FIG. 6D(a), FIG. 6E(b) and FIG. 6F(c) are diagrams for one example of a gesture for adjusting a remittance according to one embodiment of the present invention;

FIG. 7 is a diagram for a control method of specifying a remittance counterpart after confirmation of a remittance according to one embodiment of the present invention;

FIG. 13 is a diagram for a control method of transmitting prescribed contents to each other according to one embodiment of the present invention;

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
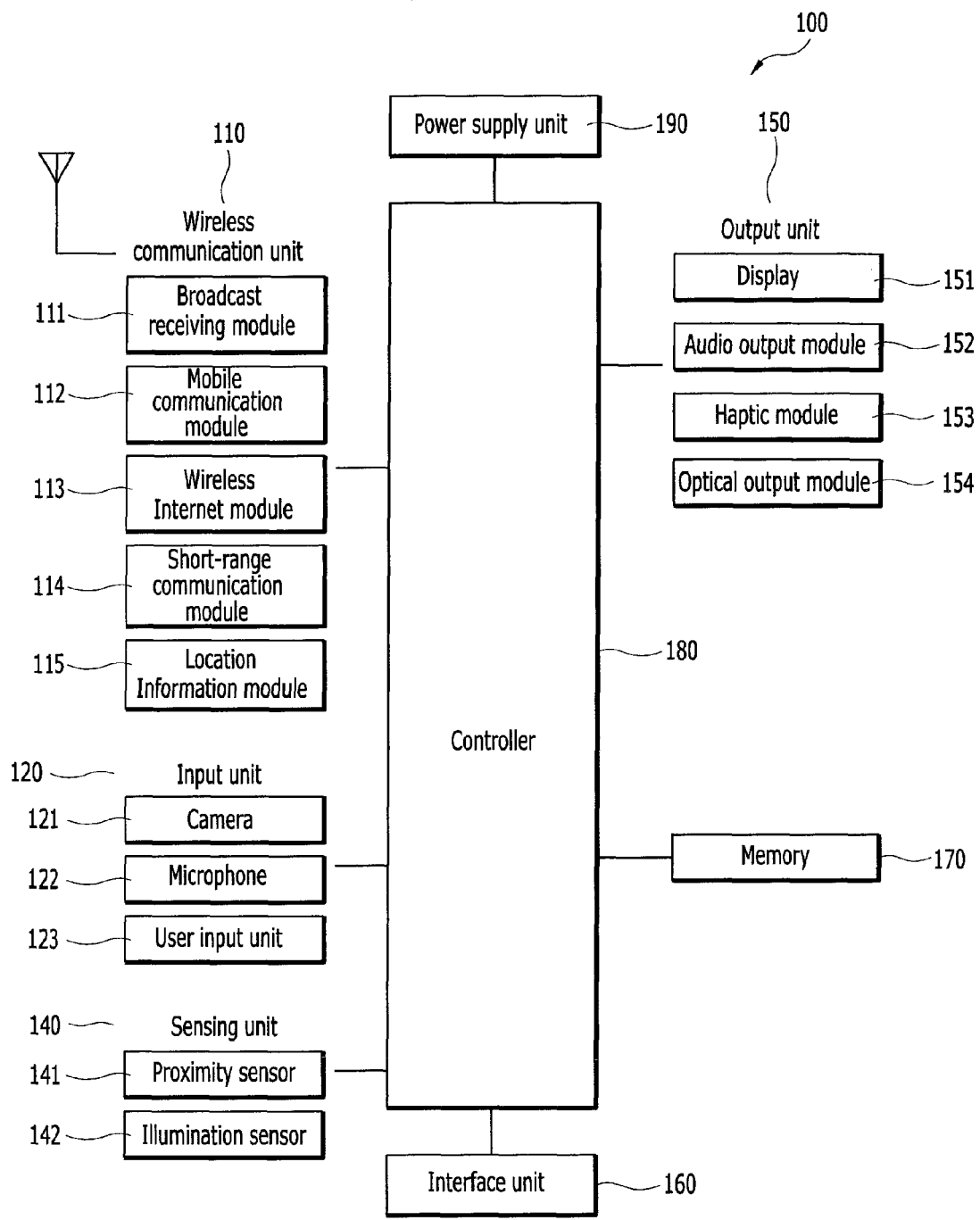
FIG. 1A is a block diagram of a mobile terminal in accordance with the present disclosure.
Figure 1B:
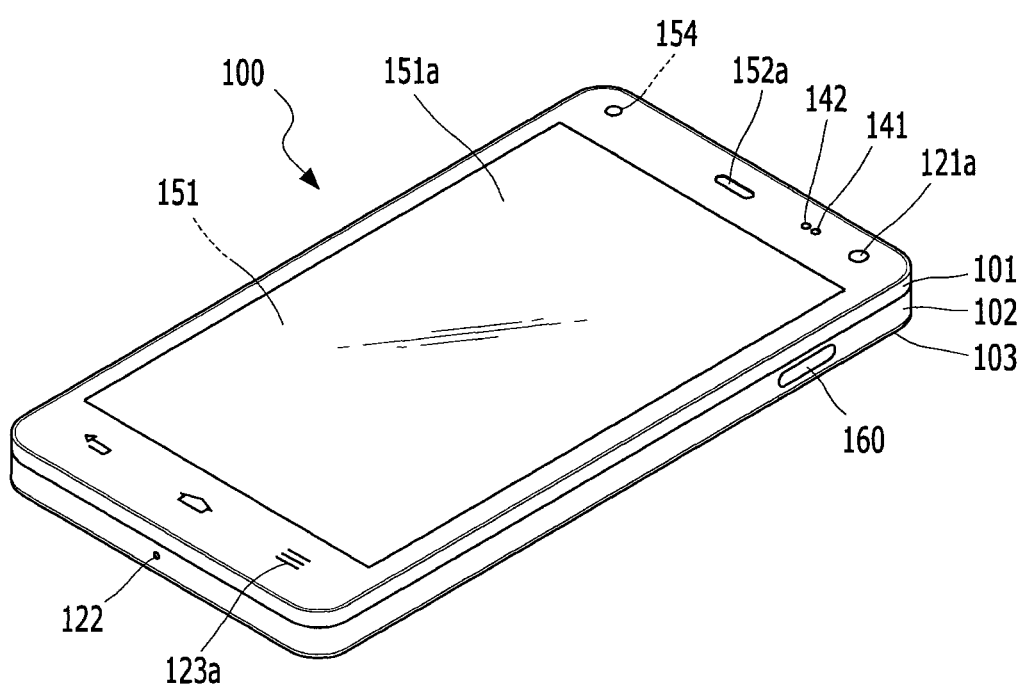
FIGS. 1B and 1C are conceptual views of one example of the mobile terminal, viewed from different directions
Figure 1C:
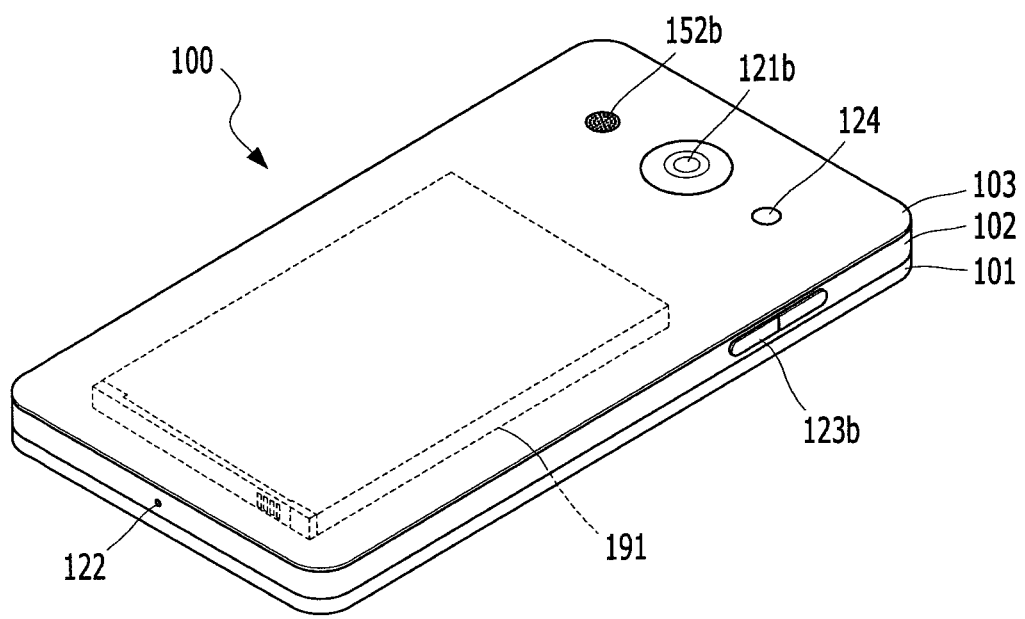

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
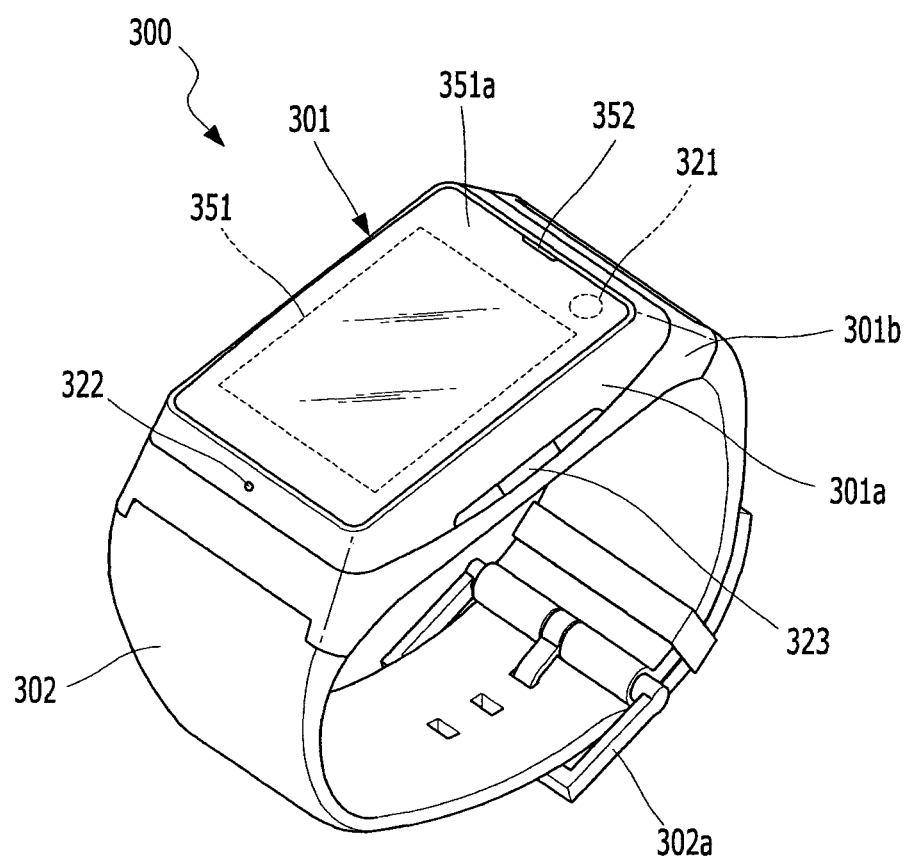
FIG. 2 is a perspective diagram for one example of a mobile terminal 300 of a watch type related to another embodiment of the present invention.

FIG. 2 is a perspective view illustrating one example of a watch-type mobile terminal 300 in accordance with another exemplary embodiment.

As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 3:
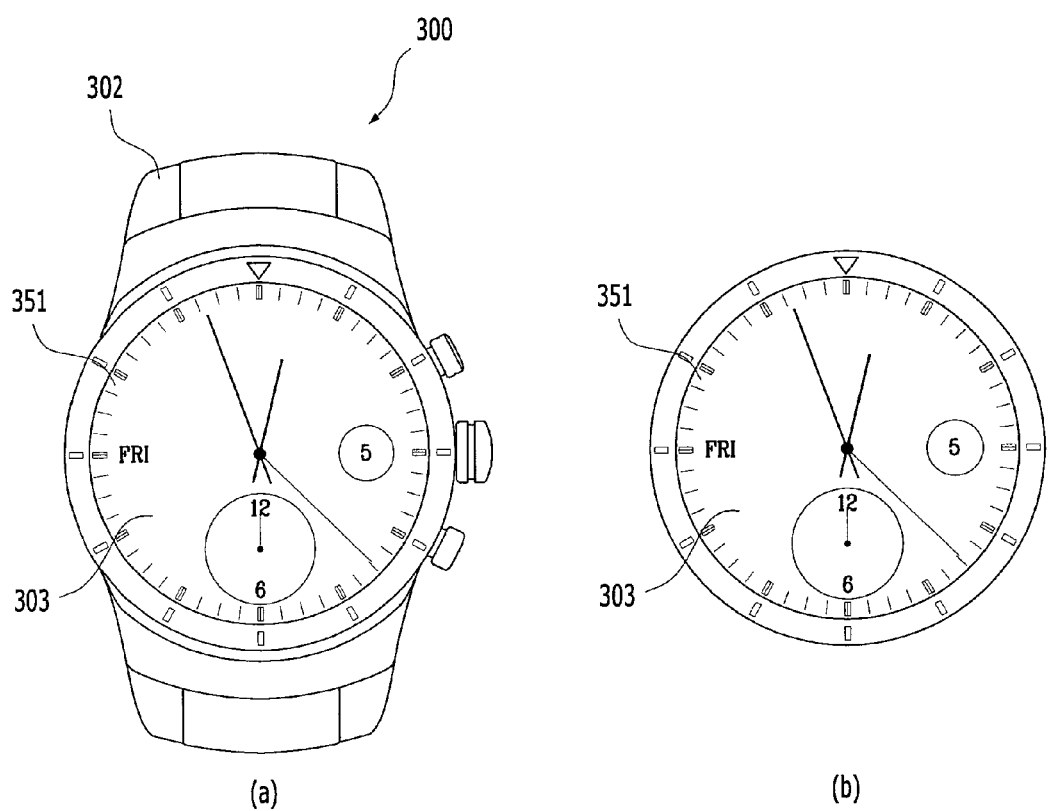
FIG. 3 is a front diagram for one example of a mobile terminal 300 of a watch according to ne embodiment of the present invention.

FIG. 3 is a front diagram for one example of a mobile terminal 300 of a watch according to ne embodiment of the present invention.

Referring to FIG. 3 (a), a mobile terminal 300 includes a touchscreen 351 in a circular shape and currently displays a numeric plate 303 through the touchscreen 351. In the following drawings to describe the present invention, an exterior of the mobile terminal 300 shall be omitted but the touchscreen 351 shall be illustrated like FIG. 3 (b).

As mentioned in the foregoing description, since limitations may be put on the input means of the mobile terminal 300 of the watch type, the ongoing demand for an input means of a new type is rising. To this end, according to one embodiment of the present invention, it is proposed to sense movement using the sensing device 140 of the mobile terminal 100. And, it is also proposed to control a primary function of the mobile terminal 300 using the sensed movement. In this case, the user's gesture may include a gesture using a hand having the mobile terminal 300 worn thereon.

Particularly, according to one embodiment of the present invention, it is proposed to designate a counterpart terminal of a running function using a gesture performed in a manner that one first of one mobile terminal 100 worn on a corresponding wrist is bumped into another first of another mobile terminal 100 worn on a corresponding wrist.

In particular, while a first user and a second user wear a first mobile terminal and a second mobile terminal, respectively, if a gesture performed in a manner of bumping fists of the first user and the second user is sensed, when the mobile terminal runs a prescribed function, the second mobile terminal can be designated as a counterpart terminal.

Such an embodiment shall be described in detail with reference to FIG. 4 as follows.

Figure 4:
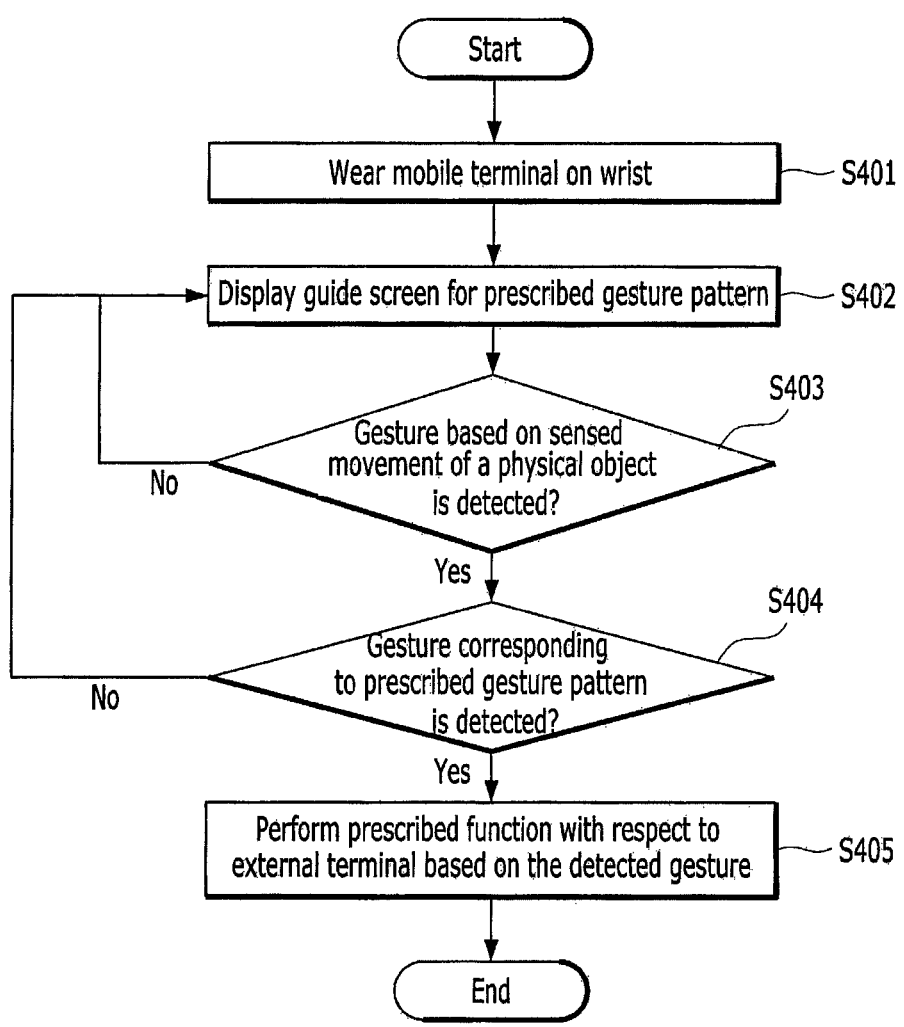
FIG. 4 is a flowchart for a control method of running a prescribed function through a user's gesture detection according to one embodiment of the present invention.

FIG. 4 is a flowchart for a control method of running a prescribed function through a movement sensing according to one embodiment of the present invention.

Referring to FIG. 4, in a step S401, the controller 180 can sense that the mobile terminal 300 is worn on a wrist.

In a step S402, the controller 180 can display a guide screen for a prescribed gesture pattern. According to one embodiment of the present invention, if a prescribed gesture pattern among a plurality of gesture patterns inputtable from a user is inputted, it is able to run a function mapped to the inputted prescribed gesture pattern. In particular, in order to inform a user of a prescribed gesture pattern for running a prescribed function, the controller 180 can display the guide screen.

In a step S403, while the mobile terminal is worn 100, the controller 180 senses whether an input of bumping into an external terminal is received. If the input is not received, the controller 180 can go back to the step S402. If the input is received, the controller 180 can go to a step S404.

In the step S404, using a result of the detection through the sensing device 140, the controller 180 determines whether a gesture corresponding to the prescribed pattern displayed through the guide screen is detected. If the gesture is not sensed, the controller 180 can go back to the step S402. If the movement of a physical object is sensed, the controller 180 goes to a step S405 and is then able to perform a prescribed function having the external terminal set as a target.

For example, the prescribed function may include one of a function of transferring money to an account associated with the external terminal, a function of transmitting a prescribed content to the external terminal, and the like. In particular, in order to specify the external terminal and to perform a prescribed function on the specified external terminal, according to one embodiment of the present invention, a gesture of bumping fists is sensed.

In the following description, the steps shown in FIG. 4 are described in detail with reference to the configuration diagram of the mobile terminal 100.

Figure 5:
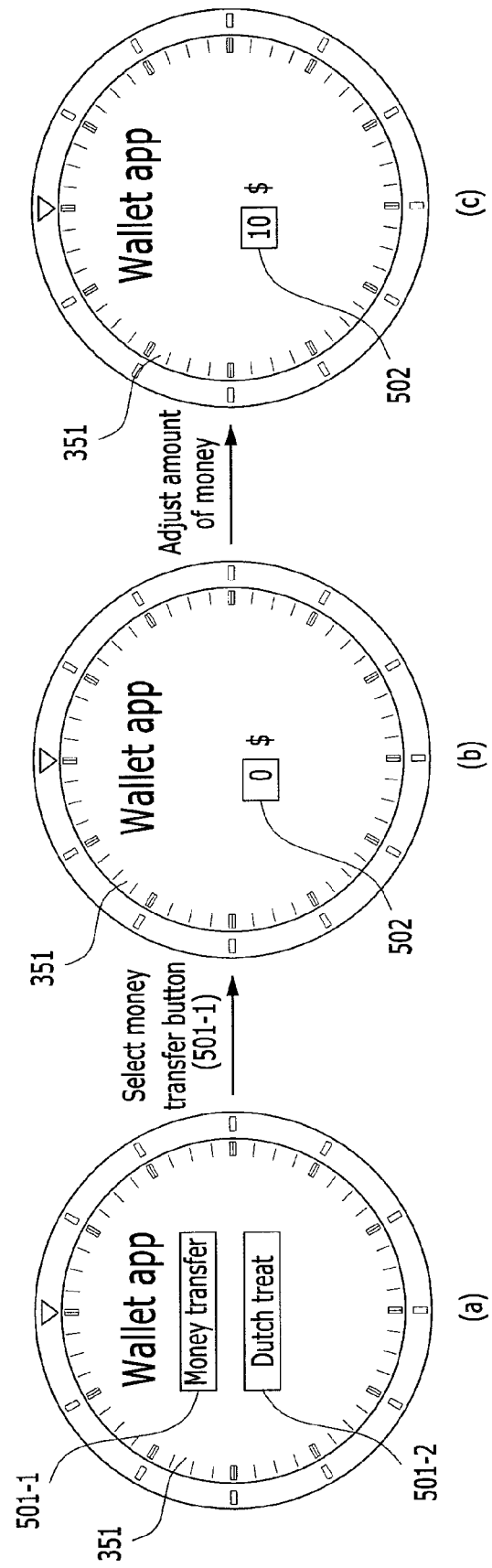
FIG. 5 is a diagram for configuration of a control method for performing a function of transferring money according to one embodiment of the present invention.

FIG. 5 is a diagram for configuration of a control method for performing a function of transferring money according to one embodiment of the present invention.

According to the above-described method, if a user makes a first with a hand having the mobile terminal 100 worn thereon and then hits the made first into a first of a different user having worn a counterpart terminal, a prescribed amount of money can be transferred to an account of the different user.

Referring to FIG. 5 (a), a diagram of a running configuration of a wallet application is illustrated. In this running configuration diagram, a money transfer button 501-1 and a Dutch treat button 501-2 can be included. In this case, the wallet application is a sort of example and may mean a program for managing virtual cash of a user. The Dutch treat button 501-2 may mean a button for performing a Dutch treat function. In this case, the Dutch treat function means a function of transferring or receiving an amount of money by distributing a prescribed amount of money to a plurality of terminals.

If the money transfer button 501-1 is selected (e.g., if an input of touching the money transfer button 501-1 is received), referring to FIG. 5 (b), the controller 180 can display a money amount input window 502. After the money amount of the input window 502 has been adjusted [FIG. 5 (c)], if a confirmation command is received, the controller 180 can confirm a money transfer amount.

For example, a gesture for confirming the money transfer amount may include a gesture of making a first with a hand having the mobile terminal 100 worn thereon.

The example of the gesture for adjusting the money amount is described in detail with reference to FIG. 6A, FIG. 6B, FIG. 6C, FIG. 6D, FIG. 6E and FIG. 6F as follows.

FIG. 6A, FIG. 6B, FIG. 6C, FIG. 6D, FIG. 6E and FIG. 6F are diagrams for one example of a gesture for adjusting a remittance according to one embodiment of the present invention.

According to one embodiment of the present invention, it is proposed to adjust an amount of money using a gesture of lifting up or lowering down a hand having the mobile terminal 300 worn thereon.

FIG. 6B shows a state that an amount of 10$ is inputted to the money amount input window 502. If a gesture of lifting up a hand having the mobile terminal 100 worn thereon while making a first is sensed, the controller 180 can adjust upward the money amount of the money amount input window 502 by a first unit (e.g., by 10 as FIG. 6C). On the other hand, if a gesture of lowering down a hand having the mobile terminal 100 worn thereon while making a first is sensed, the controller 180 can adjust downward the money amount of the money amount input window 502 by the first unit (as FIG. 6A).

Likewise, FIG. 6E shows a state that an amount of 10$ is inputted to the money amount input window 502. If a gesture of lifting up a hand having the mobile terminal 100 worn thereon while opening a first is sensed, the controller 180 can adjust upward the money amount of the money amount input window 502 by a second unit (e.g., by 1 as FIG. 6F). On the other hand, if a gesture of lowering down a hand having the mobile terminal 100 worn thereon while opening a first is sensed, the controller 180 can adjust downward the money amount of the money amount input window 502 by the second unit (as FIG. 6D).

In particular, according to the above-described method, the adjustment unit is determined in a manner of distinguishing a fist-made state and a fist-open state from each other. If a gesture of lifting up is received, the upward adjustment can be made based on the determined adjustment unit. If a gesture of lowering down is received, the downward adjustment can be made based on the determined adjustment unit.

According to one embodiment of the present invention, the sensing unit 140 may include a blood flow detection sensor. While the mobile terminal 300 is worn on a wrist, if a blood flow in the wrist is detected, a fist-open state and a fist-made state can be distinguished from each other. The reason for this is that if a first is made, a flow of blood is interrupted to reduce a blow flow. In particular, the controller 180 may be able to distinguish the fist-made state from the fist-open state based on a signal detected through the blood flow detection sensor.

According to the embodiment described with reference to FIG. 6A, FIG. 6B, FIG. 6C, FIG. 6D, FIG. 6E and FIG. 6F, the control method of adjusting the remittance is taken as one example. And, it is apparent to those skilled in the art that the embodiment described with reference to FIG. 6A, FIG. 6B, FIG. 6C, FIG. 6D, FIG. 6E and FIG. 6F can be applied to various cases including a case of adjusting numerals, a case of adjusting enlargement/reduction of a screen, a case of adjusting a volume, and the like.

According to the embodiments described with reference to FIGS. 5 to 6B, a control method of confirming a remittance is described. A control method of transferring a confirmed remittance to a counterpart account is described in detail with reference to FIG. 7 as follows.

FIG. 7 is a diagram for a control method of specifying a remittance counterpart after confirmation of a remittance according to one embodiment of the present invention.

Referring to FIG. 7 (a), as mentioned in the foregoing description with reference to the step S402 shown in FIG. 4, a guide screen 701-1 for a prescribed gesture pattern can be displayed.

According to one embodiment of the present invention, for the security and the malfunction prevention, it is proposed to display the guide screen 701-1 for a prescribed gesture pattern selected from a plurality of gesture patterns. If the prescribed gesture pattern is inputted, it is proposed to run (or launch) a prescribed function. One example of the gesture pattern shall be described in detail with reference to FIG. 8 later.

Referring to FIG. 7 (a), a first guide screen 701-1 for a first gesture pattern 702 is currently displayed. After a user has checked the first guide screen 701-1, the user can transfer the amount of money confirmed in FIG. 5 by inputting the first gesture pattern 702.

For example, the first gesture pattern 702 shown in FIG. 7 may include a gesture performed in a manner that the user of the mobile terminal 300 currently wearing the mobile terminal 300 on a wrist of a hand makes a first and then bumps the made first into a first of a different user of an external terminal 300'.

In particular, if the first gesture pattern 702 is applied, the controller 180 displays a screen 705 (e.g., Transfer 10$?) for a user to confirm a remittance. If a confirmation gesture is received, the controller 180 can transfer the confirmed remittance to an account associated with the external terminal 300' of the different user. In doing so, the confirmation gesture may include a combination of a gesture 703 applied in a manner that a user checks the touchscreen 351 by raising the wrist having the mobile terminal 300 worn thereon and a gesture of making a first after the former gesture 703. In particular, in case that the screen 705 for confirming the amount of money is displayed, since the user needs to confirm the transferred amount of money, the user may check the touchscreen 351 by raising the wrist having the mobile terminal 300 worn thereon. After confirming the remittance, it may consider a gesture of making a first for confirmation. Therefore, according to one embodiment of the present invention, it is proposed to transfer an adjusted amount of money by a combination of two kinds of gestures (e.g., a checking gesture and a confirming gesture).

Furthermore, in case that an earphone is connected, since an amount of money can be checked through sound, the gesture 703 for checking the amount of money may not be necessary. Therefore, according to one embodiment of the present invention, if it is detected that the earphone is connected, the controller 180 skips the display of the screen 705 for checking the amount of money and displays an amount check notification through the earphone. As shown in FIG. 7 (b), in doing so, optionally, the controller 180 may display both of the amount check notification through the earphone and the screen 705 for checking the amount of the money. If a confirmation gesture (e.g., a gesture of making a first) is detected, the controller 180 can transfer the amount of money.

Meanwhile, the method of specifying the external terminal 300' of the different user based on the bumping gesture may cause a problem. According to one embodiment of the present invention, in case that the bumping gesture is received through the sensing device 140, by identifying at least one or more adjacent external terminals using a currently location of the mobile terminal 100 [first identification] and then identifying a terminal having detected a gesture corresponding to the bumping gesture among the identified external terminals, it is able to specify a corresponding external terminal. If the corresponding external terminal is specified, an associated account information may be received from the corresponding external terminal. If an account information associated with the specified external terminal is saved in advance, it may be able to refer to the saved result. Meanwhile, the control method of identifying an external terminal using a bumping action may be non-limited by the above-described method. And, it may be possible to specify an external terminal based on various control methods. Besides, it is unnecessary for a power of a counterpart external terminal to be activated. In particular, although a counterpart external terminal is in deactivated state (i.e., idle state), the counterpart external terminal can enter an activated state in response to the bumping action. After the counterpart external terminal has entered the activated state, the counterpart external terminal can be specified by the aforementioned operation.

Figure 8:
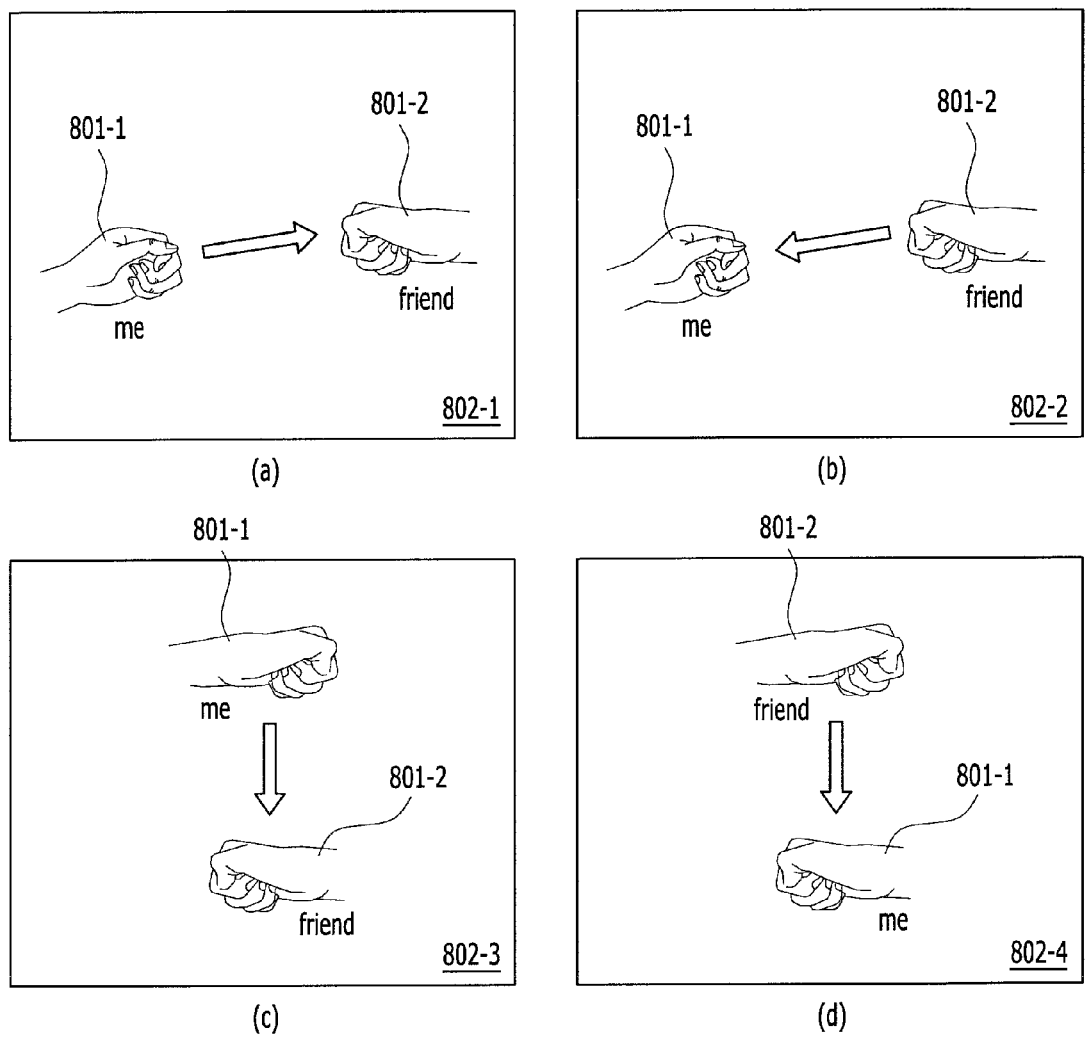
FIG. 8 is a diagram for examples of a gesture pattern according to one embodiment of the present invention.

FIG. 8 is a diagram for examples of a gesture pattern according to one embodiment of the present invention. In particular, it is able to distinguish the gesture pattern using a combination of at least one of a speed, a direction and a bumped location.

FIG. 8 (a) shows a gesture 802-1 of bumping a hand 801-1 having the mobile terminal 300 worn thereon into a hand 801-2 having an external terminal worn thereon by horizontally moving the former hand 801-1 in a direction of the latter hand 801-2. On the other hand, FIG. 8 (b) shows a gesture 802-2 of bumping the hand 801-2 having the external terminal worn thereon into the hand 801-1 having the mobile terminal 300 worn thereon by horizontally moving the former hand 801-2 in a direction of the latter hand 801-1. And, FIG. 8 (c) shows a gesture 802-3 of bumping the hand 801-1 having the mobile terminal 300 worn thereon into the hand 801-2 having the external terminal worn thereon by vertically moving the former hand 801-1 in a direction of the latter hand 801-2. Moreover, FIG. 8 (d) shows a gesture 802-4 of bumping the hand 801-2 having the external terminal worn thereon into the hand 801-1 having the mobile terminal 300 worn thereon by vertically moving the former hand 801-2 in a direction of the latter hand 801-1.

According to one embodiment of the present invention, it is proposed to distinguish the above gestures from each other based on a result of detection through the sensing device 140. Particularly, the gestures can be distinguished from each other based on a result of detection through one of the gyroscopic sensor, the gravity sensor and the acceleration sensor mentioned in the foregoing description. For instance, if a speed increases in a direction vertical to gravity and then decreases rapidly, it is able to detect a gesture of bumping into something during a vertical movement using the acceleration sensor and the gyroscopic sensor, which is similar to the gesture shown in FIG. 8 (a). Besides, it is also possible to detect a user's gesture using additional sensor(s) other than the above-mentioned sensors.

Meanwhile, according to one embodiment of the present invention, it is proposed that the sensing device 140 is active despite a deactivated sate of the mobile terminal 300. Generally, in case of the mobile terminal 300 of the watch type, since it is necessary to activate the touchscreen 351 and the like automatically by recognizing a user's gesture, it is proposed to activate the sensing device 140 despite a state that prescribed function of the touchscreen 151 or the like is deactivated [i.e., idle state].

Like the example of the gesture patterns shown in FIG. 8, if a prescribed function is run using a single gesture pattern randomly selected from a plurality of gesture patterns, malfunction can be prevented and security can be improved.

A control method of distributively assigning a prescribed amount of money to a plurality of terminals is described in detail with reference to FIG. 9 as follows.

Figure 9:
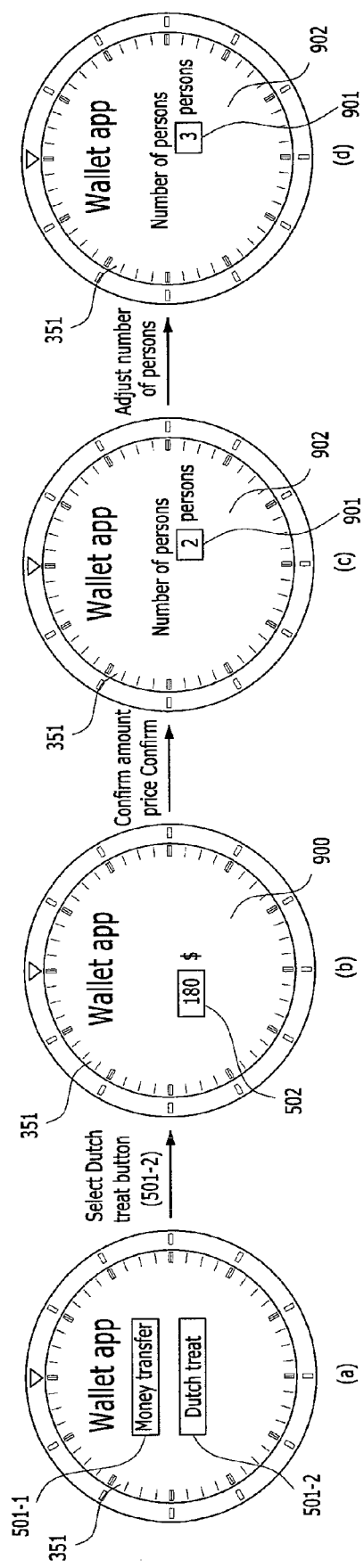
FIG. 9 is a diagram for a control method of assigning a prescribed amount of money to each of a plurality of terminals according to one embodiment of the present invention.

FIG. 9 is a diagram for a control method of assigning a prescribed amount of money to each of a plurality of terminals according to one embodiment of the present invention.

When several persons have meal at a restaurant or coffee at a coffee shop, one of the persons may make a payment and receive a predetermined amount of money from each of the rest of the persons. In this case, it may be appropriate to assign an amount of money resulting from dividing a total amount of the payment by the number of the persons having the meal or coffee to each of the persons. According to one embodiment of the present invention, in order to facilitate such a process, it is proposed to provide a control method of facilitating a money transaction between users who wear the mobile terminals 300 of the watch type, respectively.

Referring to FIG. 9 (a), like FIG. 5 (a), a running configuration diagram of a wallet application is illustrated. In this running configuration diagram, a money transfer button 501-1 and a Dutch treat button 501-2 can be included. Referring to FIG. 9 (b), if an input for selecting the Dutch treat button 501-2 is received, the controller 180 displays a money amount check screen 900 including a money amount input window 502. Subsequently, a preset prescribed amount is inputted to the money amount input window 502. In this case, the prescribed amount may include a restaurant payment charge, a coffee shop payment charge, or the like.

Referring to FIG. 9 (c), if a gesture for checking an amount of money (e.g., a gesture of opening a hand and then making a first) is received, the controller 180 can switch the money amount check screen 900 to a person check screen 902. In this case, the person check screen 902 may include a person input window 901 for inputting the number of persons. For instance, 2 persons are inputted as basic persons.

If a command for adjusting the number of persons is received, referring to FIG. 9 (d), the controller 180 can change the basic persons into adjusted persons. In this case, the command for adjusting persons may include the gesture for adjusting the amount of money described with reference to FIG. 6A and FIG. 6B.

If a person confirmation command (e.g., an input of opening a mobile terminal worn hand and then making a first) is received, the controller 180 can confirm the persons to which an amount of money will be distributed. A control method of transferring money after the person confirmation is described in detail with reference to FIG. 10 as follows.

Figure 10:
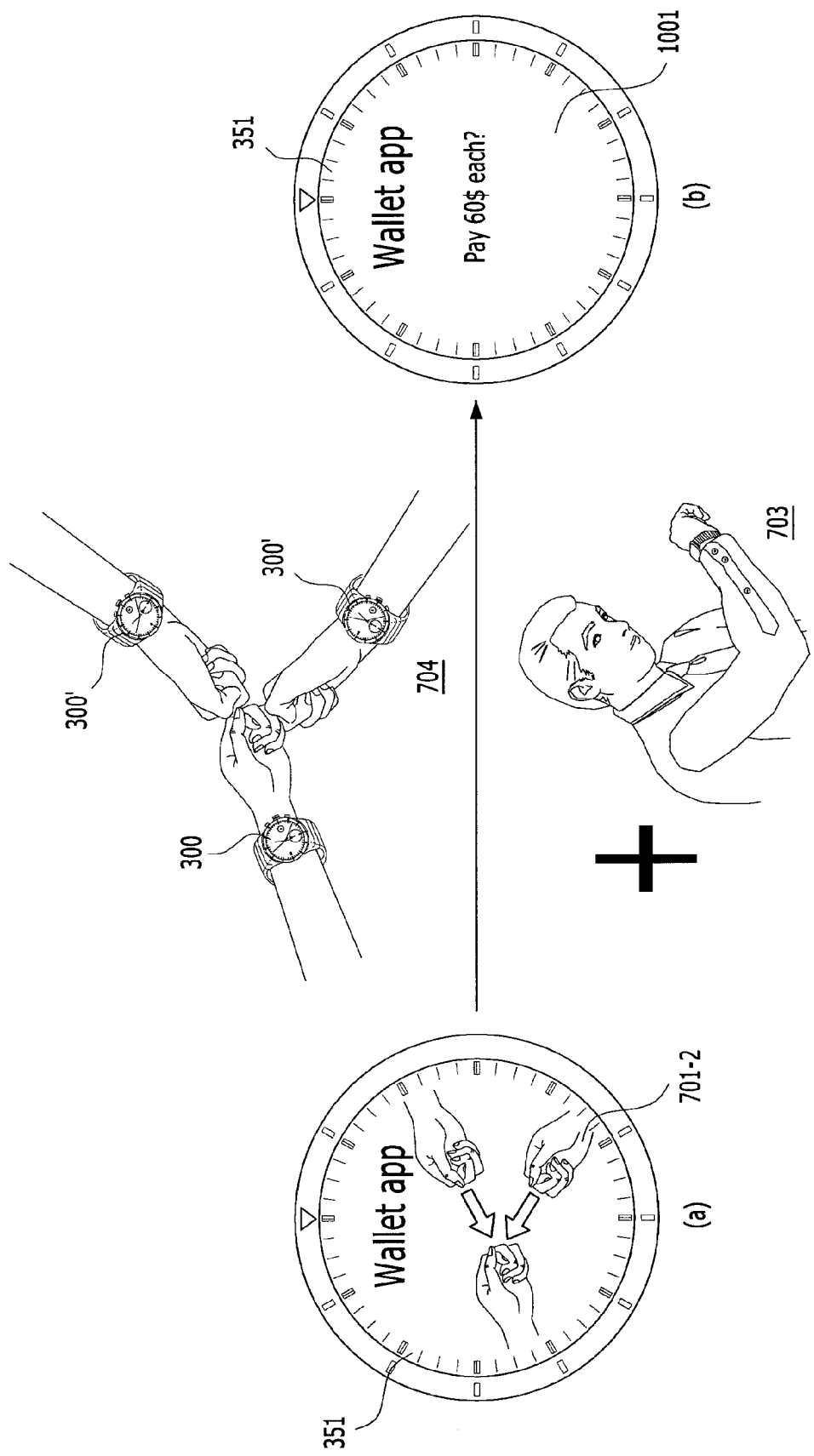
FIG. 10 is a diagram for a control method of assigning a prescribed amount of money to each of a determined number of persons according to one embodiment of the present invention.

FIG. 10 is a diagram for a control method of assigning a prescribed amount of money to each of a determined number of persons according to one embodiment of the present invention.

Referring to FIG. 10 (a), after persons are confirmed like FIG. 9, the controller 180 can display a guide screen 701-2. In this case, the guide screen 701-2 is the screen for guiding a user to a second gesture pattern 704.

In particular, the second gesture pattern 704 may include a gesture of bumping fists of a mobile terminal wearing user and other external terminal wearing users.

If the second gesture pattern 704 is received from the user, referring to FIG. 10 (b), the controller 180 can display a payment check screen 1001. In this case, the payment check screen 1001 means the screen for checking an amount of money assigned in a manner of dividing a prescribed amount of money by the determined number of persons. According to the example shown in FIG. 10 (b), the payment check screen 1001 is displayed as 'Pay 60$ each?'.

After a gesture 703 of checking the payment check screen 1001 has been received, if a confirmation command (e.g., a gesture of opening a hand and then making a first) is received, the controller 180 can confirm a transceived amount of money. A control method of performing a Dutch-treat function based on a confirmed number of persons and a confirmed amount of money according to one embodiment of the present invention is described in detail with reference to FIG. 11 as follows.

Figure 11:
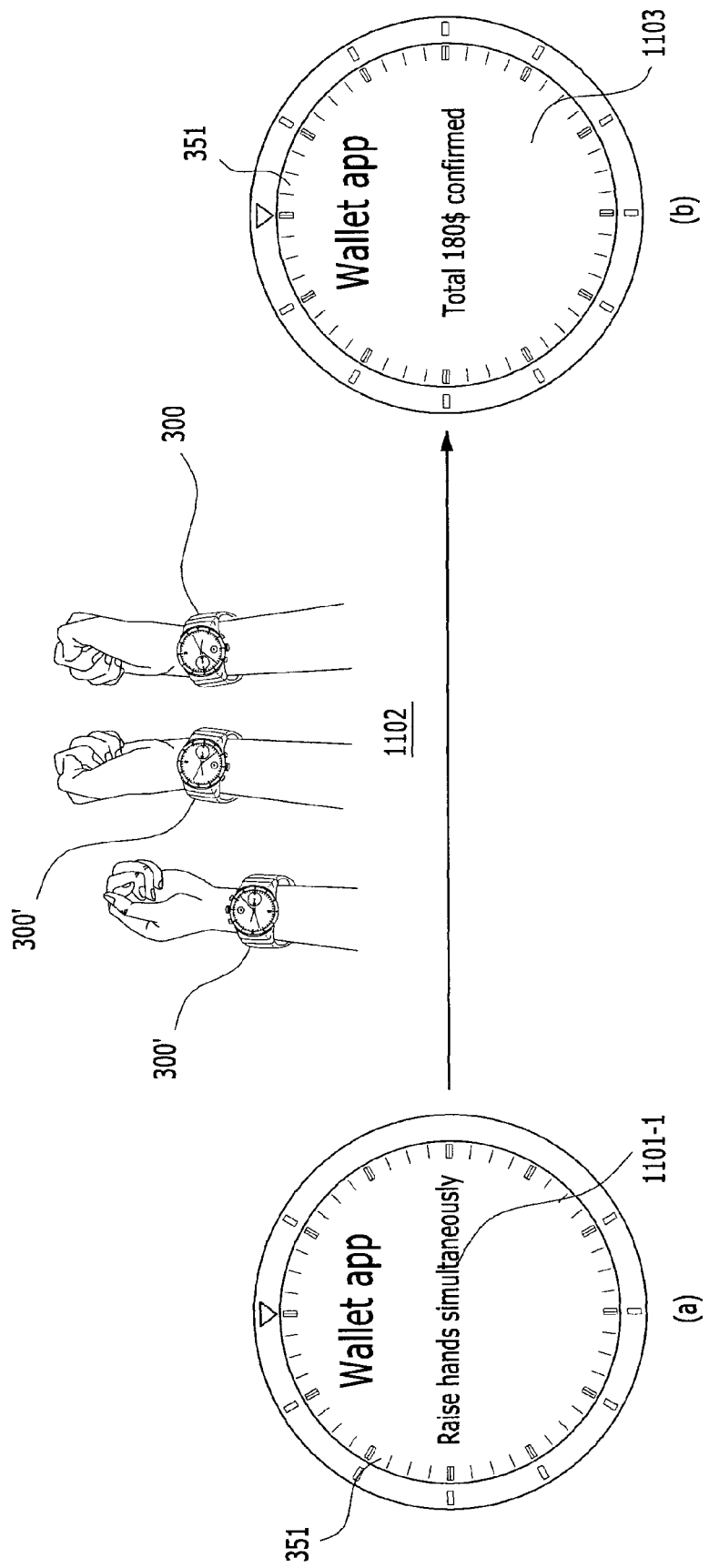
FIG. 11 is a diagram for a control method of performing a Dutch-treat function based on a confirmed number of persons and a confirmed amount according to one embodiment of the present invention.

FIG. 11 is a diagram for a control method of performing a Dutch-treat function based on a confirmed number of persons and a confirmed amount of money according to one embodiment of the present invention.

Referring to FIG. 11 (a), if the amount of money and the persons are confirmed like FIG. 10, the controller 180 can display a guide screen 1101-1 for a prescribed gesture pattern 1102. In this case, the guide screen 1101-1 may guide a user to a single gesture pattern randomly selected from various gesture patterns such as a gesture of raising hand simultaneously, a gesture of stacking down hands simultaneously, a gesture of making fists simultaneously and the like.

As mentioned in the foregoing description with reference to FIG. 7, the gesture 703 for checking the payment check screen 1001 may not be requested if an earphone is connected by Bluetooth or the like. In particular, even if the confirmation command is received only by skipping the gesture 703, the Dutch treat function may be performed.

Referring to FIG. 11 (b), if the prescribed gesture pattern 1102 indicated by the guide screen 1101-1 is detected, the controller 180 can perform the Dutch treat function based on the confirmed amount money and the confirmed persons.

According to the embodiments mentioned in the foregoing description, an amount of money is transferred to a prescribed counterpart terminal and an amount of money is received from another terminal. In the following description, a control method for transceiving contents instead of transferring an amount of money is described in detail with reference to the accompanying drawings as follows.

Figure 12:
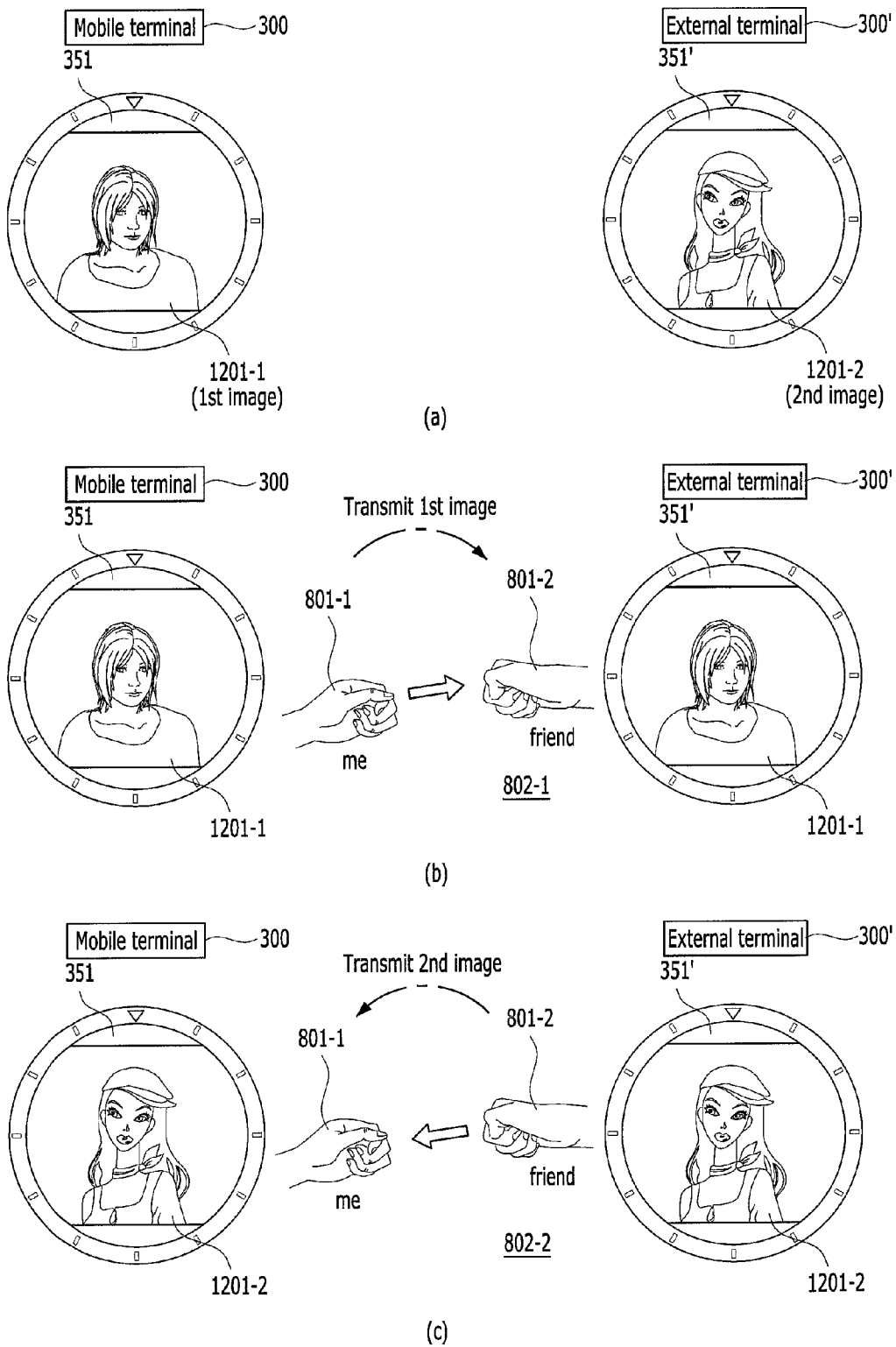
FIG. 12 is a diagram for a control method of transceiving a prescribed content according to one embodiment of the present invention.

FIG. 12 is a diagram for a control method of transceiving a prescribed content according to one embodiment of the present invention.

Referring to FIG. 12 (a), a first image 1201-1 is currently displayed on a first touchscreen 351 of a mobile terminal 300. Likewise, a second image 1201-2 is currently displayed on a second touchscreen 351' of an external terminal 300'.

According to the embodiment related to FIG. 12, it is proposed to determine a main agent in transceiving a content through discrimination among the former gestures described with reference to FIG. 8.

Referring to FIG. 12 (b), in response to a gesture 802-1 of bumping one hand 801-1 having the mobile terminal 300 worn thereon into the other hand 801-2 having the external terminal 300' worn thereon in a manner of moving the one hand 801-1 horizontally in a direction of the other hand 801-2, it is able to control the mobile terminal 300 to transmit a prescribed content (e.g., the currently displayed first image 1201-1) to the external terminal 300'.

In particular, a bumping side by moving may be controlled to be set as a transmitting agent, while a bumped side without moving may be controlled to be set as a receiving agent.

On the other hand, referring to FIG. 12 (c), in response to a gesture 802-2 of bumping one hand 801-2 having the external terminal 300' worn thereon into the other hand 801-1 having the mobile terminal 300 worn thereon in a manner of moving the one hand 801-2 horizontally in a direction of the other hand 801-1, it is able to control the external terminal 300' to transmit a prescribed content (e.g., the currently displayed second image 1201-2) to the mobile terminal 300.

Meanwhile, if two terminals bump against each other in a manner that one terminal moves while the other stops, a control method of mutually transmitting images currently displayed by the two terminals may be possible. Such an embodiment is described in detail with reference to FIG. 13 as follows.

FIG. 13 is a diagram for a control method of transmitting prescribed contents to each other according to one embodiment of the present invention.

Referring to FIG. 13 (a), like the example shown in FIG. 12 (a), a first image 1201-1 is currently displayed on a first touchscreen 351 of a mobile terminal 300. Likewise, as shown in FIG. 13(b), a second image 1201-2 is currently displayed on a second touchscreen 351' of an external terminal 300'.

If a gesture for exchanging contents is detected, the mobile terminal 300 may transmit the first image 1201-1 to the external terminal 300' and receive the second image 1201-2 from the external terminal 300'.

Meanwhile, according to the embodiments described with reference to FIG. 12 and FIG. 13, a currently displayed image is transmitted only, by which the present invention is non-limited. Different cases are described in detail with reference to FIGS. 14 to 16 as follows.

Figure 14:
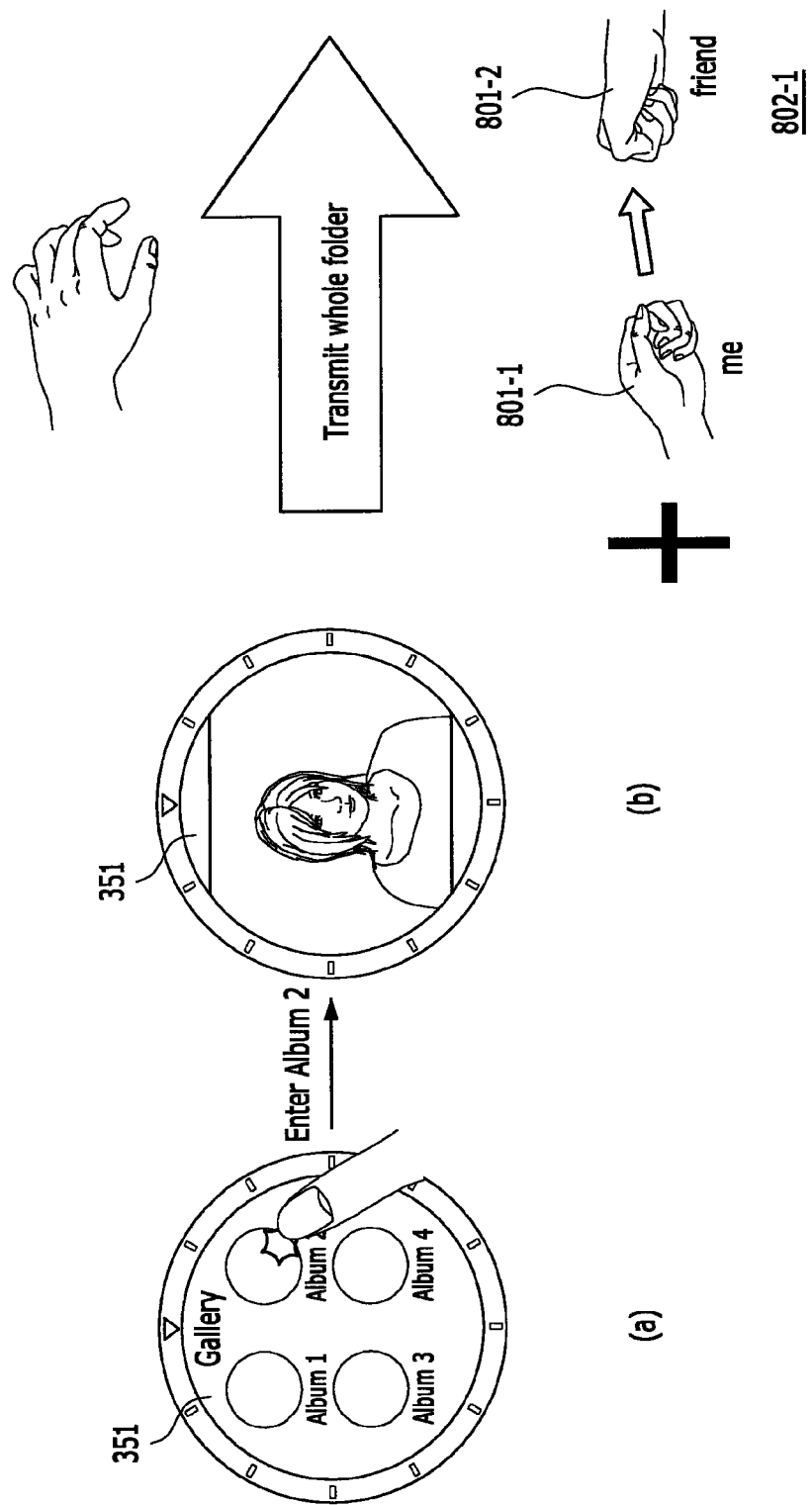
FIG. 14 is a diagram for a gesture and control method for transmitting a whole folder containing a prescribed content according to one embodiment of the present invention.

FIG. 14 is a diagram for a gesture and control method for transmitting a whole folder containing a prescribed content according to one embodiment of the present invention.

Referring to FIG. 14 (a), a plurality of folder icons are currently displayed. Referring to FIG. 14 (b), if an input for selecting a specific folder Album 2 from the displayed folder icons is received, the controller 180 can enter the specific folder (i.e., display an image contained in the corresponding folder).

After a gesture 1401 for selecting the whole folder has been received, if a gesture 802-1 of bumping one hand 801-1 having a mobile terminal 300 worn thereon into the other hand 801-2 having an external terminal 300' worn thereon by horizontally moving the former hand 801-1 in a direction of the latter hand 801-2 is detected, the controller 180 can control the whole specific folder (or, entire contents contained in the specific folder) to be transmitted to the external terminal 300'. In particular, according to this control method, the whole contents contained in the specific folder can be collectively transmitted.

The gesture 1401 for selecting the whole folder may include a more intuitive input such as a gesture of clenching a fist. The reason for this is that the gesture of clenching a first can be recognized as a gesture for collectively managing a plurality of contents.

Figure 15:
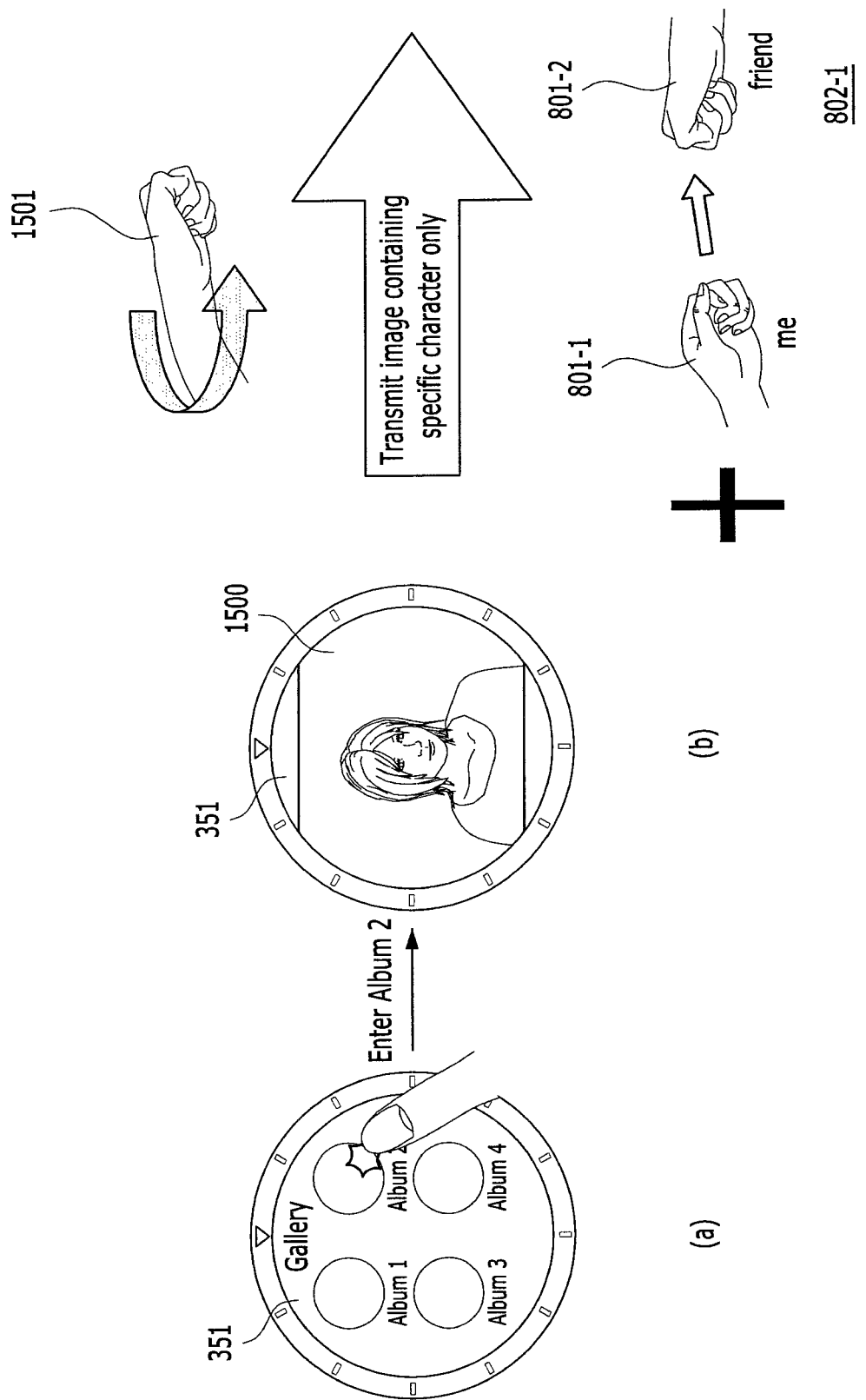
FIG. 15 is a diagram for a gesture and control method of selecting and transmitting a content (e.g., an image) containing a specific character according to one embodiment of the present invention.

FIG. 15 is a diagram for a gesture and control method of selecting and transmitting a content (e.g., an image) containing a specific character according to one embodiment of the present invention.

Referring to FIG. 15 (a), a plurality of folder icons are currently displayed like FIG. 14 (a). Referring to FIG. 15 (b), if an input for selecting a specific folder Album 2 from the displayed folder icons is received, the controller 180 can enter the specific folder (i.e., display an image 1500 contained in the corresponding folder).

After a gesture 1501 for selecting an image containing a specific character has been received, if a gesture 802-1 of bumping one hand 801-1 having a mobile terminal 300 worn thereon into the other hand 801-2 having an external terminal 300' worn thereon by horizontally moving the former hand 801-1 in a direction of the latter hand 801-2 is detected, the controller 180 can control a content containing the specific character to be transmitted to the external terminal 300'. In particular, according to this control method, the whole contents contained in the specific folder can be collectively transmitted. In this case, the content containing the specific character may include an image or video containing the specific character.

The gesture 1501 for selecting the image containing the specific character may include a gesture of clenching a first with the mobile terminal worn hand and then rotating the first over a prescribed angle.

Figure 16:
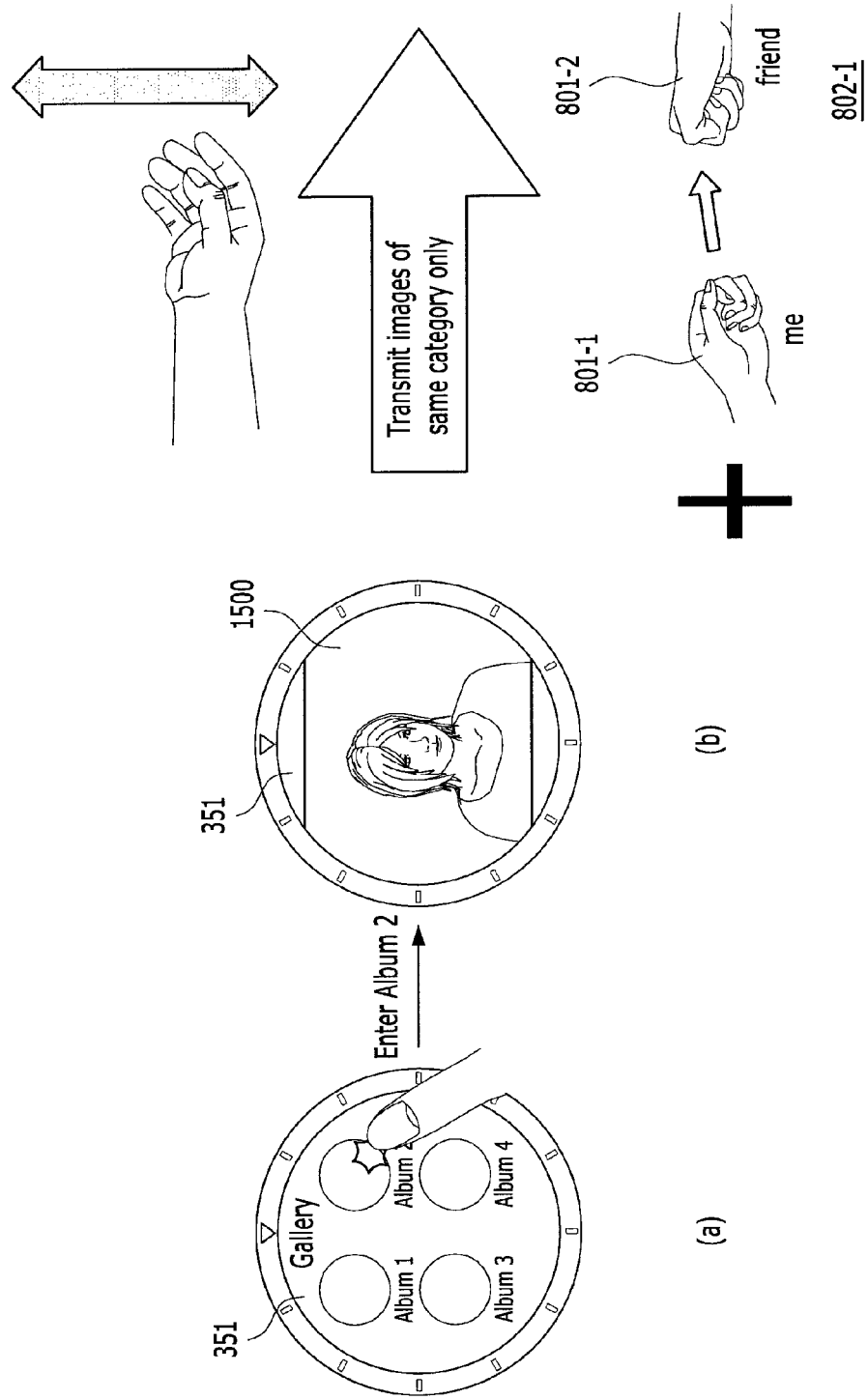
FIG. 16 is a diagram for a gesture and control method of collectively selecting and transmitting contents belonging to the same category of a prescribed content according to one embodiment of the present invention.

FIG. 16 is a diagram for a gesture and control method of collectively selecting and transmitting contents belonging to the same category of a prescribed content according to one embodiment of the present invention.

Referring to FIG. 16 (a), a plurality of folder icons are currently displayed like FIG. 14 (a). Referring to FIG. 16 (b), if an input for selecting a specific folder Album 2 from the displayed folder icons is received, the controller 180 can enter the specific folder (i.e., display an image 1500 contained in the corresponding folder).

After a gesture 1601 for collectively selecting contents of the same category has been received, if a gesture 802-1 of bumping one hand 801-1 having a mobile terminal 300 worn thereon into the other hand 801-2 having an external terminal 300' worn thereon by horizontally moving the former hand 801-1 in a direction of the latter hand 801-2 is detected, the controller 180 can control the contents belonging to the same category of a prescribed content to be transmitted to the external terminal 300'. In particular, according to this control method, the whole contents belonging to the same category of the prescribed content can be collectively transmitted. In this case, the prescribed content may mean a currently displayed content.

The gesture 1601 for collectively selecting the contents of the same category may include a gesture of turning up a palm of the hand having the mobile terminal 300 worn thereon and then waving the hand up and down (like a gesture of sifting).

Accordingly, the present invention provides the following effect and/or feature.

According to at least one of embodiments of the present invention, it is advantageous in that a major function of a mobile terminal can be controlled using a simple gesture only.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a primary function of the mobile terminal can be controlled using a simple gesture.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a watch type mobile terminal, comprising: a touchscreen; a wireless communication device configured to communicate with an external terminal; a band configured to be worn on a user; a sensing device configured to sense movement of a physical object having the mobile terminal provided thereon; and a controller to detect a gesture based on the sensed movement, and to perform a prescribed function with respect to the external terminal based on the detected gesture.

In another aspect of the present invention, as embodied and broadly described herein, a method of controlling a watch type mobile terminal comprising: detecting a gesture related to a physical object having the mobile terminal provided thereon, the detected gesture being a gesture with respect to an external terminal; and performing a prescribed function with respect to the external terminal based on the detected gesture.

It is to be understood that both the foregoing general description and the following detailed description of the preferred embodiments of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A watch type mobile terminal, comprising:
a touchscreen;
a wireless communication device configured to communicate with an external terminal;
a band configured to be worn on a user;
a sensing device configured to sense movement of a physical object having the mobile terminal provided thereon; and
a controller configured to:
display, on the touchscreen, a guide screen corresponding to a selected one of a plurality of prescribed gesture patterns, wherein the selected one of the prescribed gesture patterns corresponds to a prescribed function to be performed,
after the display of the guide screen, detect a bumping gesture based on the sensed movement, and
in response to the detect of the bumping gesture, perform the prescribed function with respect to the external terminal based on the detected bumping gesture, wherein the bumping gesture includes a bumped gesture of the watch type mobile terminal and the external terminal.

2. The mobile terminal of claim 1, wherein the controller distinguishes patterns of the bumping gesture into the plurality of gesture patterns based on at least one of a bumping speed and a bumping direction.

3. The mobile terminal of claim 2, wherein in response to detecting the bumping gesture corresponding to the selected one of the prescribed gesture patterns, the controller performs the prescribed function.

4. The mobile terminal of claim 2, wherein the plurality of prescribed gesture patterns include:
a first gesture that includes bumping the mobile terminal to the external terminal horizontally,
a second gesture that includes bumping the external terminal to the mobile terminal horizontally,
a third gesture that includes bumping the mobile terminal to the external terminal vertically, and
a fourth gesture that includes bumping the external terminal to the mobile terminal vertically.

5. The mobile terminal of claim 1, wherein the prescribed function is a function related to transferring a prescribed amount of money.

6. The mobile terminal of claim 5, wherein in response to detecting a first adjustment gesture, the controller adjusts the prescribed amount of money by a first unit, and
in response to detecting a second adjustment gesture, the controller adjusts the prescribed amount of money by a second unit.

7. The mobile terminal of claim 1, wherein the prescribed function is a function relating to controlling the wireless communication device to transmit a command for activating the external terminal and to transmit a prescribed content to the external terminal.

8. The mobile terminal of claim 1, wherein in response to detecting the gesture, the controller determines location information of the mobile terminal, wherein the controller identifies the external terminal, from among external terminals adjacent to the determined location information, and wherein identification of the external terminal is based on a prescribed specifying condition.

9. The mobile terminal of claim 8, wherein the prescribed specifying condition is a condition that the mobile terminal and the external terminal are adjacent to each other at a specific time.

10. A method of controlling a watch type mobile terminal comprising:
sensing movement of a physical object having the mobile terminal provided thereon;
displaying, on a touchscreen, a guide screen corresponding to a selected one of a plurality of prescribed gesture patterns, wherein the selected one of the prescribed gesture patterns corresponds to a prescribed function to be performed;
after displaying the guide screen, detecting a bumping gesture based on the sensed movement; and
in response to detecting the bumping gesture, performing the prescribed function with respect to an external terminal based on the detected bumping gesture, wherein the bumping gesture includes a bumped gesture of the watch type mobile terminal and the external terminal.

11. The method of claim 10, comprising:
distinguishing patterns of the bumping gesture into the plurality of gesture patterns based on at least one of a bumping speed and a bumping direction; and
displaying the guide screen for the selected prescribed gesture pattern, from among the plurality of gesture patterns.

12. The method of claim 11, comprising:
detecting the bumping gesture corresponding to the selected prescribed gesture pattern, and
performing the prescribed function based on the detected bumping gesture.

13. The mobile terminal of claim 11, wherein the plurality of prescribed gesture patterns include:
a first gesture that includes bumping the mobile terminal to the external terminal horizontally,
a second gesture that includes bumping the external terminal to the mobile terminal horizontally,
a third gesture that includes bumping the mobile terminal to the external terminal vertically, and
a fourth gesture that includes bumping the external terminal to the mobile terminal vertically.

14. The method of claim 10, wherein the prescribed function is a function related to transferring a prescribed amount of money.

15. The method of claim 14, further comprising:
detecting a first adjustment gesture, and adjusting the prescribed amount of money by a first unit based on the detected first adjustment gesture; and
detecting a second adjustment gesture, and adjusting the prescribed amount of money by a second unit based on the detected second adjustment gesture.

16. The method of claim 10, wherein the prescribed function is a function related to transmitting a command for activating the external terminal and transmitting a prescribed content to the external terminal.

17. The method of claim 10, further comprising:
detecting the gesture, and determining location information of the mobile terminal based on the detected gesture; and
identifying the external terminal, from among external terminals adjacent to the determined location information,
wherein identification is based on a prescribed specifying condition.

18. The method of claim 17, wherein the prescribed specifying condition is a condition that the mobile terminal and the external terminal are adjacent to each other at a specific time.

* * * * *